US006516039B1

(12) United States Patent
Taura et al.

(10) Patent No.: US 6,516,039 B1
(45) Date of Patent: Feb. 4, 2003

(54) DIGITAL AUDIO BROADCAST RECEIVER ACQUIRING FRAME SYNCHRONIZATION QUICKLY IN THE PRESENCE OF NOISE

(75) Inventors: Kenichi Taura, Tokyo (JP); Tadatoshi Ohkubo, Tokyo (JP); Masayuki Ishida, Tokyo (JP); Masakazu Morita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/263,796

(22) Filed: Mar. 5, 1999

(30) Foreign Application Priority Data

Mar. 6, 1998 (JP) .......................................... 10-055214

(51) Int. Cl.[7] .................................................. H04L 7/00
(52) U.S. Cl. ........................ 375/354; 370/503; 370/509
(58) Field of Search ................................ 375/364, 354; 370/509, 503, 510

(56) References Cited

U.S. PATENT DOCUMENTS

| | | | | | |
|---|---|---|---|---|---|
| 4,154,984 A | * | 5/1979 | Murasov | 375/368 |
| 4,298,987 A | * | 11/1981 | Stattel et al. | 370/510 |
| 5,157,651 A | * | 10/1992 | Ghelberg et al. | 370/233 |
| 5,191,576 A | | 3/1993 | Pommier et al. | |
| 5,317,572 A | * | 5/1994 | Satoh | 370/509 |

FOREIGN PATENT DOCUMENTS

| | | | | |
|---|---|---|---|---|
| DE | 44 05 752 | | 8/1994 | |
| DE | 44 03 408 | | 2/1995 | |
| EP | 0 689 314 | | 12/1995 | |
| JP | 8-32573 A2 | * | 2/1996 | H04L/7/08 |

OTHER PUBLICATIONS

"Low–Complex Frame Synchronization in OFDM Systems", Jan–Japp van de Beek, et al., 1995 IEEE International Conference on Universal Personal Communications, New York, IEEE, Conf. 4, Nov. 6, 1995, pp. 982–986.

* cited by examiner

*Primary Examiner*—Stephen Chin
*Assistant Examiner*—David B. Lugo
(74) *Attorney, Agent, or Firm*—Birch, Stewart, Kolasch & Birch, LLP

(57) ABSTRACT

A digital audio broadcast receiver detects frame synchronization signals, measures the pulse widths of and intervals between the detected frame synchronization signals, and stores this information in a memory, together with a history of counts of frame synchronization signals, and stores this information in a memory, together with a history of counts of frame synchronization signals of certain widths detected at certain intervals. This information is retained in the memory until frame synchronization is acquired, as determined from the stored count values, enabling frame synchronization to be acquired quickly despite the false detection of frame synchronization signals due to noise.

10 Claims, 12 Drawing Sheets

FIG.3

| MODE | 1 | 2 | 3 | 4 |
|---|---|---|---|---|
| USAGE | TERRESTRIAL (SFN*1) | TERRESTRIAL, SATELLITE | TERRESTRIAL, CABLE | TERRESTRIAL (SFN*1), SATELLITE |
| BROADCAST FREQUENCY*2 | ≦ 375MHz | ≦ 1.5GHz | ≦ 3GHz | ≦ 1.5GHz |
| NUMBER OF SUBCARRIERS/SPACING | 1,536 / 1kHz | 384 / 4kHz | 192 / 8kHz | 768 / 2kHz |
| VALID SYMBOL INTERVAL | 1ms | 250 μs | 125 μs | 500 μs |
| GUARD INTERVAL | 246 μs | 62 μs | 31 μs | 123 μs |
| DATA SYMBOLS PER FRAME | 75 | 75 | 150 | 75 |
| FRAME LENGTH | 96ms | 24ms | 24ms | 48ms |
| BIT RATE | 2.4Mbps | | | |
| BANDWIDTH | 1,536MHz | | | |

*1 : SINGLE FREQUENCY NETWORK *2 : MOBILE SERVICE

DIGITAL AUDIO BROADCAST RECEIVER ACQUIRING FRAME SYNCHRONIZATION QUICKLY IN THE PRESENCE OF NOISE

BACKGROUND OF THE INVENTION

The present invention relates to a digital audio broadcast receiver, more particularly to the method by which a digital audio broadcast receiver acquires frame synchronization.

It will be assumed that the received digital audio broadcast signal, referred to below as a DAB signal, complies with Recommendation BS.774 of the Radiotelecommunication Sector of the International Telecommunications Union (ITU-R), entitled "Service requirements for digital sound broadcasting to vehicular, portable, and fixed receivers using terrestrial transmitters in the VHF/UHF bands." The broadcast signal is accordingly divided into frames, each beginning with a null symbol in which the carrier amplitude is reduced to zero as a frame synchronization signal.

In the rest of each frame, orthogonal frequency-division multiplexing (OFDM) is used to combine a plurality of subcarrier signals onto which digital data are modulated by differential quaternary phase-shift keying (QPSK). Powerful error-correcting techniques, including interleaving and convolutional coding, enable the digital data to be transmitted at high speed with high reliability, even to mobile receiving stations experiencing substantial multipath fading. The digital data comprise compressed audio data coded according to the ISO/MPEG Audio Layer Two standard.

Incidentally, ISO stands for International Standards Organization, and MPEG for Motion Picture Experts Group.

A digital audio broadcast receiver acquires frame synchronization by detecting the null symbols at the beginning of each frame. The receiver must contend with four BS.774 transmission modes, having three different frame lengths and four different null symbol lengths. The receiver must infer the transmission mode from the frame and symbol lengths. The receiver must also contend with momentary fading and other types of noise, which may be falsely recognized as frame synchronization signals.

A conventional method of acquiring frame synchronization, which will be described in more detail later, starts by detecting the interval between frame synchronization signals (null symbols), using a gate circuit to block noise occurring at times when no frame synchronization signal is expected. When frame synchronization signals have been observed at a sufficient number of regular, consecutive intervals equal to the frame length in one of the transmission modes, it can be assumed with a high degree of probability that the observed frame synchronization signals are valid signals, not caused by noise. Next, if necessary, the length of the frame synchronization signals is detected to discriminate between transmission modes having the same frame length but different symbol lengths.

One problem with this method is that if a noise pulse is incorrectly recognized as a frame synchronization signal, the gate circuit may operate at the wrong times, blocking valid frame synchronization signals. A period at least equal to the longest frame length then elapses before the mistake is recognized. When the mistake is recognized, the search for frame synchronization signals must begin anew.

Another problem is that discrimination between the two transmission modes having equal frame lengths does not begin until the frame length has been identified. Reliable discrimination requires the measurement of the lengths of a number of frame synchronization signals, so the entire process is time-consuming.

A further problem is that the gate circuit does not block noise pulses occurring near expected frame synchronization signals. When a frame synchronization signal is immediately preceded by a noise pulse, for example, the length of the noise pulse may be measured instead of the length of the frame synchronization signal, leading to incorrect mode discrimination.

SUMMARY OF THE INVENTION

An object of the present invention is to acquire frame synchronization in a digital audio broadcast receiver quickly and reliably, despite the presence of noise.

The invented digital audio broadcast receiver has a synchronization signal detector for detecting frame synchronization signals, a control unit for acquiring frame synchronization according to the detected frame synchronization signals, a timer for measuring pulse widths and intervals, and a memory. The memory stores a history of the pulse widths of the detected frame synchronization signals, of the intervals between these signals, and of counts of frame synchronization signals of predetermined pulse widths detected at predetermined intervals.

By maintaining a history of past pulse widths, intervals, and counts in the memory, the control unit is able to consider both pulse widths and intervals from the beginning of the acquisition process, and to recover from mistakes made due to noise without having to start counting over again from zero.

BRIEF DESCRIPTION OF THE DRAWINGS

In the attached drawings:

FIG. 3 is a table of transmission mode parameters;

DETAILED DESCRIPTION OF THE INVENTION

Figure 1:
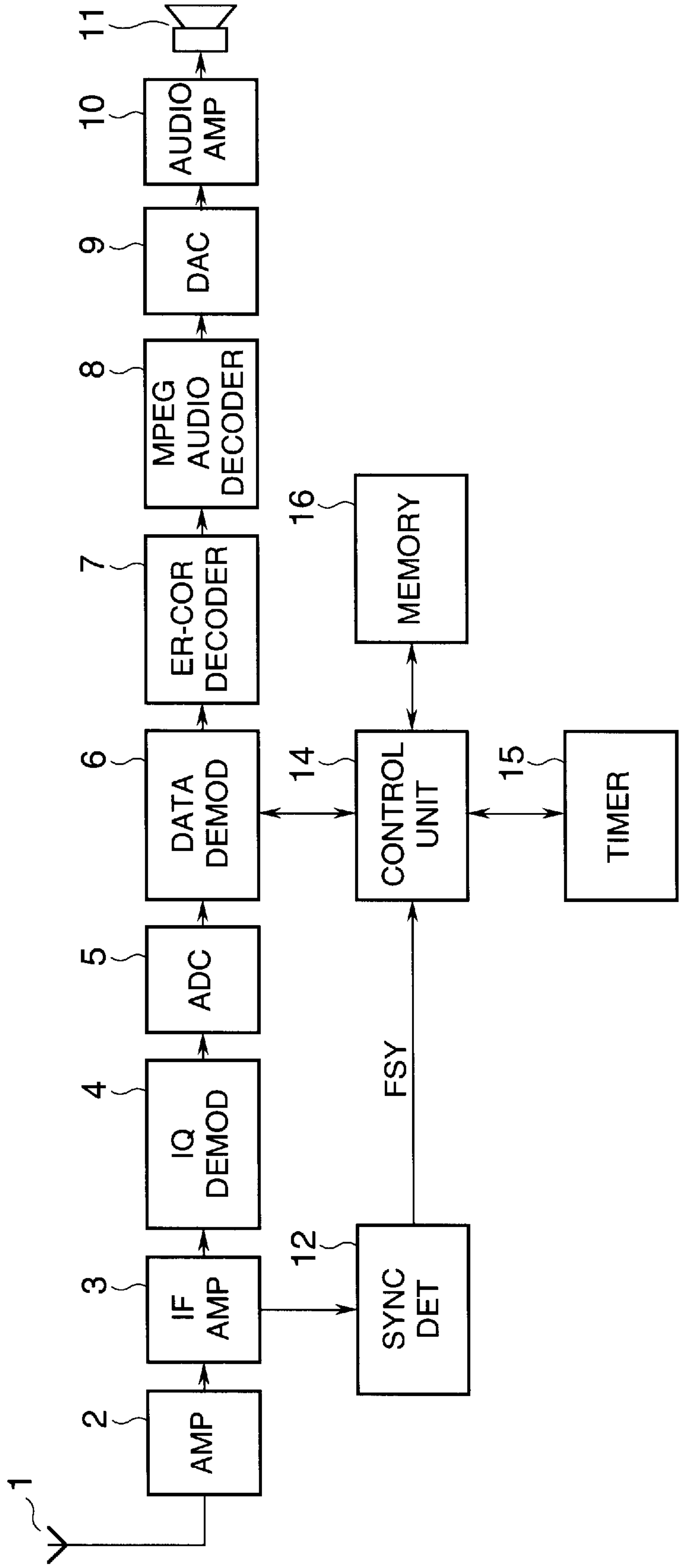
FIG. 1 is an exemplary block diagram of the invented digital audio broadcast receiver.

Embodiments of the invention will be described with reference to the attached drawings, in which like parts are indicated by like reference characters.

Referring to FIG. 1, each of the embodiments is a digital audio broadcast receiver comprising an antenna 1, a radio-frequency amplifier (RF AMP) 2, an intermediate-frequency amplifier (IF AMP) 3, an orthogonal demodulator (IQ DEMOD) 4, an analog-to-digital converter (ADC) 5, a data demodulator 6, an error-correcting (ER-COR) decoder 7, an MPEG audio decoder 8, a digital-to-analog converter (DAC) 9, an audio amplifier 10, a loudspeaker 11, a synchronization signal detector (SYNC DET) 12, a control unit 14, a timer 15, and a memory 16.

A DAB signal received at the antenna 1 is amplified and converted to an intermediate-frequency signal by the radio-frequency amplifier 2. The intermediate-frequency signal is amplified by the intermediate-frequency amplifier 3, which also rejects undesired components such as adjacent-channel interference. The orthogonal demodulator 4 converts the filtered signal to a complex-valued baseband signal, which is sampled and converted to a digital signal by the analog-to-digital converter 5.

The data demodulator 6 performs a discrete Fourier transform (DFT) to convert the digital signal to a series of symbols, each of which is an array of complex numbers representing subcarrier phases and magnitudes, and differentially demodulates the subcarrier phase information to obtain digital data values. These values are output to the error-correcting decoder 7 in a predetermined sequence, matching the sequence used in the transmitter. The error-correcting decoder 7 de-interleaves the received data, and performs a convolutional decoding process that corrects errors and recovers the transmitted data.

The transmitted data include compressed audio data, which are supplied to the MPEG audio decoder 8, and program-related information indicating the content and format of the broadcast, which are supplied to the control unit 14. The MPEG audio decoder 8 decodes the audio data according to ISO/MPEG Layer Two rules, and the digital-to-analog converter 9 converts the decoded audio data to an audio signal. The analog audio signal is amplified by the audio amplifier 10 and reproduced through the loudspeaker 11.

Figure 2:
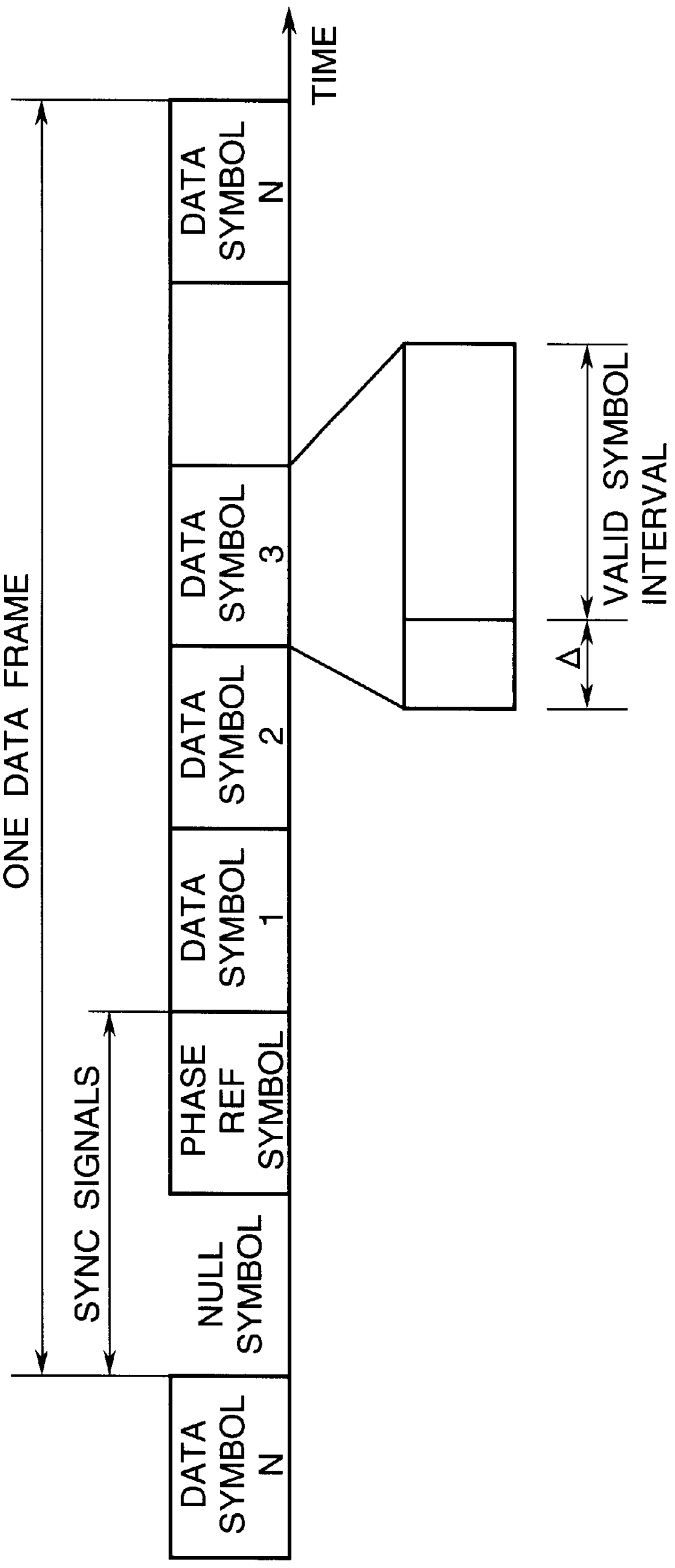
FIG. 2 illustrates the frame structure of a DAB signal.

The DAB signal has the frame structure shown in FIG. 2. As already noted, each frame begins with a null symbol. The null symbol is followed by a phase reference symbol, which serves as a synchronization signal for differential demodulation, then N data symbols, where N is a predetermined positive integer. Each data symbol includes a guard interval (Δ) and a valid symbol interval.

Referring to FIG. 3, the four transmission modes specified by ITU-R Recommendation BS.774 differ in regard to the number of subcarriers, the subcarrier spacing, and the frame length. All modes provide a bit rate of 2.4 megabits per second (14 bps), but each mode has a different symbol length; that is, a different valid symbol interval and guard interval.

Referring again to FIG. 1, the synchronization signal detector 12 detects the envelope of the intermediate-frequency signal, and provides the control unit 14 with a frame synchronization pulse signal FSY that normally goes low at the beginning of the null symbol, goes high at the end of the null symbol, and remains high throughout the rest of each frame. The control unit 14, which comprises a microprocessor, microcontroller, or similar computing device, initially uses the frame synchronization pulse signal FSY to identify the frame length and transmission mode. After acquiring frame synchronization in this way, the control unit 14 uses FSY to identify the start of each frame, estimate the timing of the phase reference symbol and data symbols, and synchronize the discrete Fourier transform performed by the data demodulator 6 with the symbol boundaries.

Figure 4:
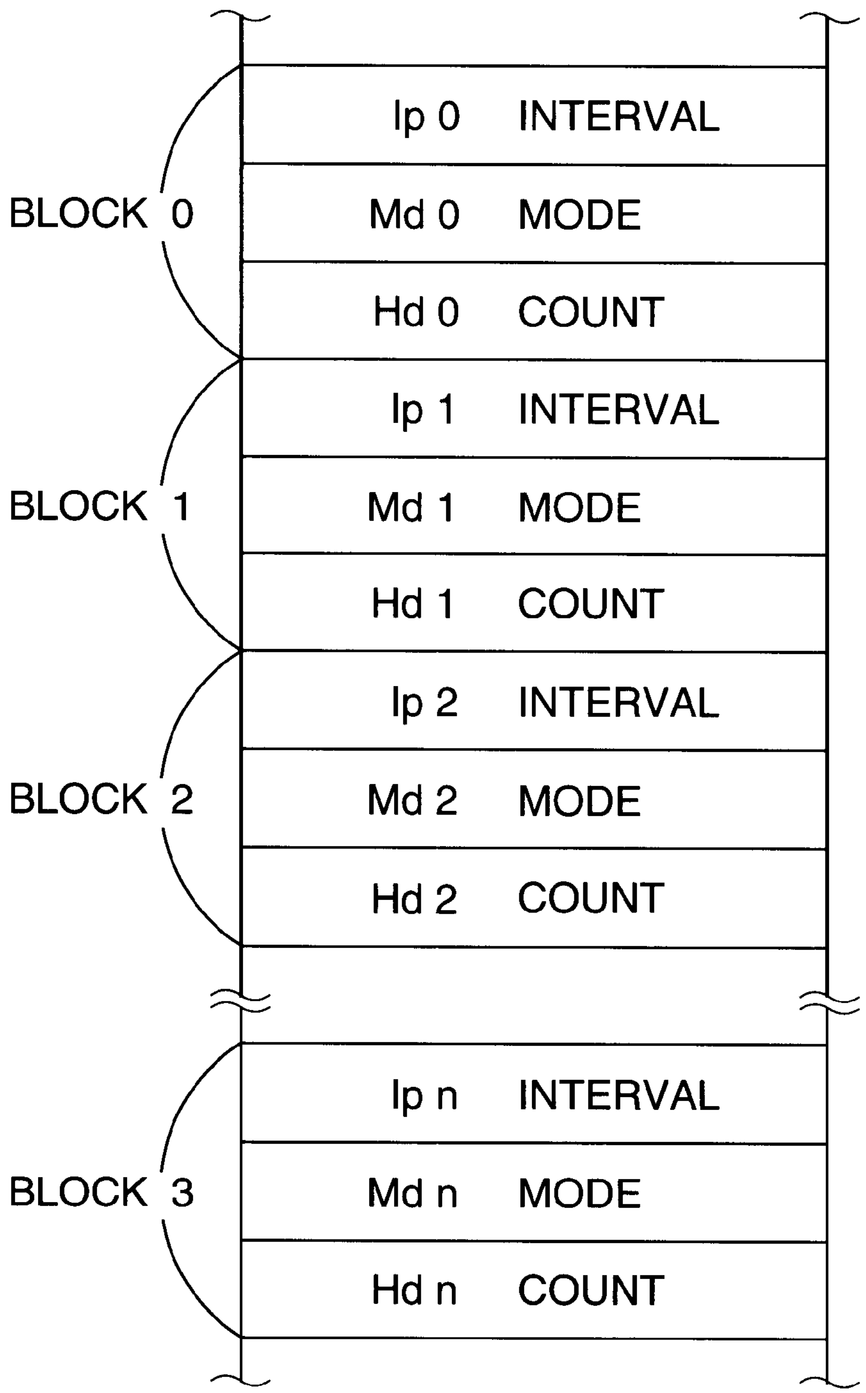
FIG. 4 illustrates blocks of data stored in the memory in FIG. 1.

In the first embodiment, while the control unit 14 is attempting to acquire frame synchronization, the memory 16 stores blocks of data as shown in FIG. 4. Each block describes one pulse output by the synchronization signal detector 12. The first entry (Ip) in the block is the pulse interval; that is, the elapsed time since the preceding pulse. The second entry (Md) is the transmission mode inferred by the control unit 14 from the pulse width. The third entry (Hd) is a historical count of preceding pulses having widths consistent with the inferred mode, detected at consecutive intervals substantially equal to the frame length in the inferred mode.

Next, the operation of the first embodiment in acquiring frame synchronization will be explained.

Figure 5A:
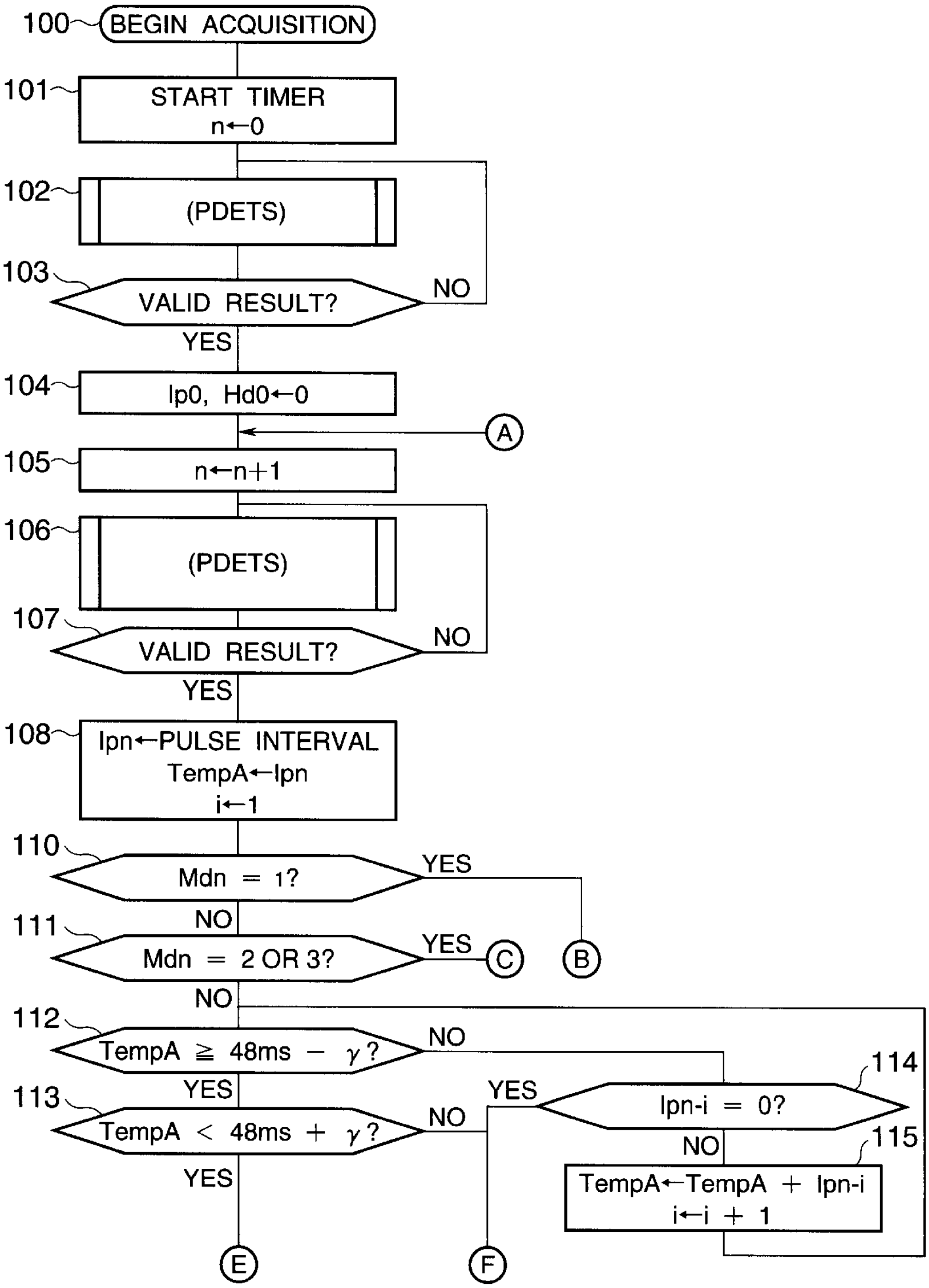
FIGS. 5A, 5B, and 5C are a flowchart describing the operation of a first embodiment of the invention.

Referring to FIG. 5A, when the acquisition operation begins (step 100), the control unit 14 starts the timer 15 and initializes a block-number variable (n) to zero (step 101), then performs a frame synchronization pulse detection process (step 102) to detect the next pulse received from the synchronization signal detector 12. In this process (named PDETS), which will be described in more detail below, the control unit 14 measures the pulse width. If the pulse width is sufficiently close to the expected null-symbol length in one of the four transmission modes listed in FIG. 3, the control unit 14 stores the corresponding transmission mode number (one to four) as Md0 in the memory 16, and sets a validity flag to indicate a valid result. If the pulse width is not sufficiently close to any of the four expected null-symbol lengths, the control unit 14 clears the validity flag to indicate an invalid result. Upon completion of this process, the control unit 14 tests the validity flag (step 103), and returns to step 102 if an invalid result is indicated. The loop comprising steps 102 and 103 is repeated until a valid result is obtained, whereupon the control unit 14 sets Ip0 and Hd0 to zero (step 104).

The control unit 14 now increments the block number n (step 105), performs the frame synchronization pulse detection process again (step 106), and tests the result (step 107). If the result is invalid, the control unit 14 returns to step 106, repeating steps 106 and 107 until a valid result is obtained. When a valid result is obtained, the control unit 14 writes the time interval between the detected FSY pulse and the last preceding valid FSY pulse in the memory 16 as Ipn, assigns the same value (Ipn) to a temporary variable TempA, and initializes another variable i to 1 (step 108).

Variables n, TempA, and i are stored in the memory 16, or in registers in the control unit 14. The block number variable n identifies the FSY pulse currently being detected or processed, and the data block in the memory 16 storing information about this pulse; TempA indicates the interval between the most recent pulse and the i-th preceding pulse.

Next, the control unit 14 tests the mode value Mdn, which was written in the memory 16 in step 106. First, the control unit 14 tests for mode one (step 110), proceeding to FIG. 5B if Mdn is equal to one. If Mdn is not equal to one, the control unit 14 tests for modes two and three (step 111), proceeding to FIG. 5C if Mdn is equal to two or three.

If Mdn is not equal to one, two, or three, then Mdn must be equal to four, so the control unit 14 searches backward for a pulse occurring substantially one mode-four frame length before the most recent pulse. First, the control unit 14 compares the interval TempA with a lower limit equal to forty-eight milliseconds (48 ms), which is the frame length in mode four, minus a predetermined amount $\gamma$ (step 112). If TempA is equal to or greater than this lower limit, the control unit 14 compares TempA with an upper limit equal to forty-eight milliseconds plus $\gamma$ (step 113). If TempA is less than this upper limit, then the i-th preceding pulse occurred substantially one mode-four frame length before the most recent pulse, and the control unit 14 proceeds to a certain point (E) in FIG. 5B. If TempA exceeds the upper limit, then no pulse occurred substantially one mode-four frame length before the most recent pulse, and the control unit 14 proceeds to another point (F) in FIG. 5B.

If TempA is less than the lower limit (48 ms−γ), the control unit 14 examines the i-th preceding pulse interval Ipn-i stored in the memory 16 (step 114). If this interval Ipn-i is zero, then the search has reached the first detected pulse (only Ip0 is equal to zero), so the search has failed and the control unit 14 proceeds to point F in FIG. 5B. If the pulse interval Ipn-i is not zero, the control unit 14 adds Ipn-i to TempA, increments the variable i (step 115), and returns to step 112 to compare the new value of TempA with the mode-four frame length. The loop comprising steps 112, 114, and 115 is repeated until either TempA becomes equal to or greater than the lower limit value (48 ms−Δ), or Ipn-i becomes equal to zero.

The result of the search comprising steps 112, 113, 114, and 115 is that the control unit 14 either finds a pulse that occurred substantially one mode-four frame length before the most recent pulse, or determines that no such pulse exists. The control unit 14 proceeds to point E in FIG. 5B if the search was successful, in which case the i-th preceding pulse occurred substantially one mode-four frame length before, and to point F if the search was unsuccessful.

If Mdn is equal to one, then following step 110, the control unit 14 searches in a similar manner for a pulse occurring one mode-one frame length before the most recent pulse. This search is conducted in steps 116, 117, 118, and 119 in FIG. 5B, by comparing the pulse interval TempA with ninety-six milliseconds (96 ms), which is the frame length in mode one, plus and minus a predetermined value α. These steps are analogous to steps 112, 113, 114, and 115 in FIG. 5A, so a detailed description will be omitted.

Figure 5B:
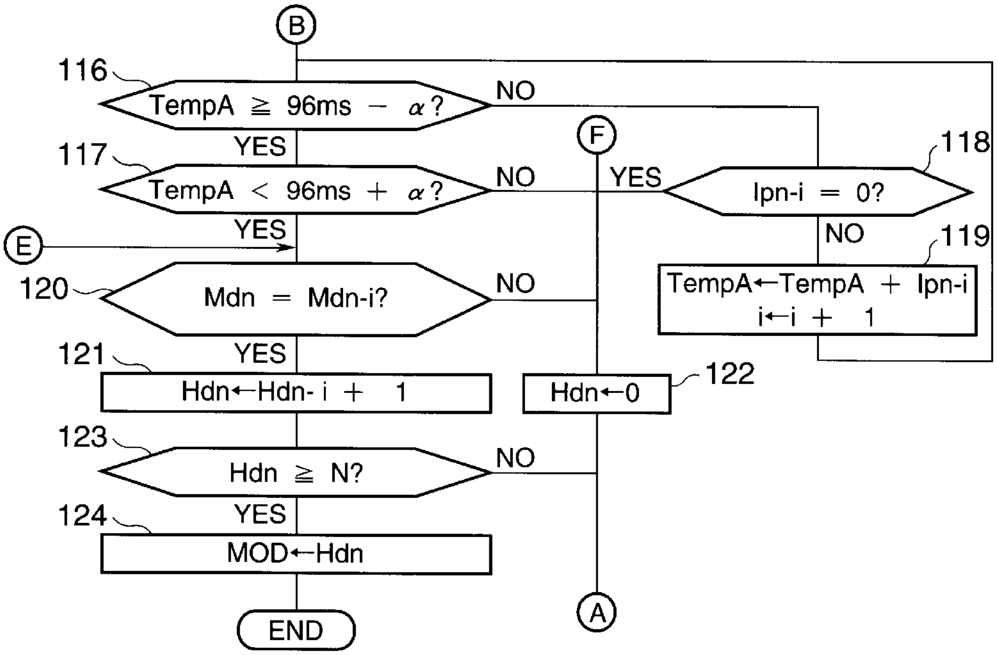

If the search in FIG. 5A or 5B is successful, that is, if the i-th preceding pulse occurred one mode-Mdn frame length before, then the control unit 14 compares the mode value Mdn and the i-th preceding mode value Mdn-i stored in the memory 16 (step 120). If these two mode values are equal, the control unit 14 sets the count Hdn in the n-th memory block to a value equal to one more than the count Hdn-i in the i-th preceding memory block (step 121). If the two mode values Mdn and Mdn-i are not equal, the control unit 14 sets Hdn to zero (step 122), and returns to step 105 in FIG. 5A to increment the block number n and detect the next pulse.

Following step 121 in FIG. 5B, the control unit 14 compares the count Hdn with a predetermined positive number N (step 123). If Hdn is equal to or greater than N, then the transmission mode is regarded as having been reliably identified, and the control unit 14 assigns the identified transmission mode (Mdn) to a variable MOD (step 124). The frame synchronization acquisition operation now ends, and the control unit 14 commences receiving operations, which are carried out according to the identified mode (MOD). If Hdn is less than N, the control unit 14 returns to step 105 in FIG. 5A to detect another pulse and seek further confirmation of the mode.

Figure 5C:
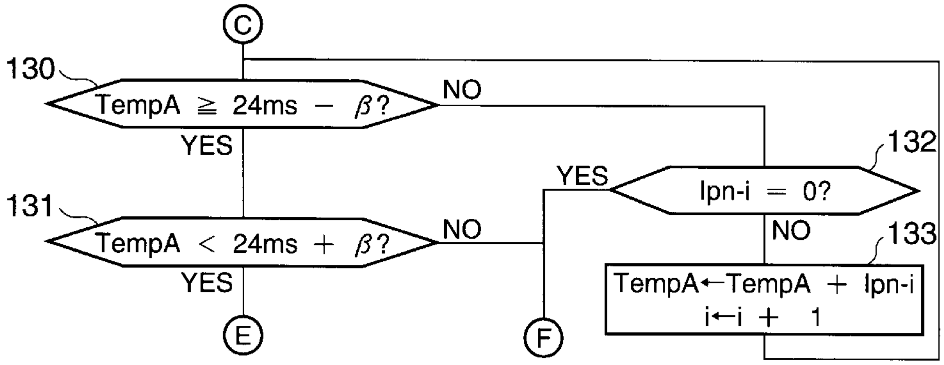

If the inferred mode Mdn is equal to two or three, then following step 111 in FIG. 5A, the control unit 14 searches for a pulse occurring one mode-two or mode-three frame length before the most recent pulse. This search is conducted in steps 130, 131, 132, and 133 in FIG. 5C, by comparing the pulse interval TempA with twenty-four milliseconds (24 ms), the frame length in both modes two and three, plus and minus a predetermined value β. The steps in FIG. 5C are analogous to steps 112, 113, 114, and 115 in FIG. 5A, so a detailed description will be omitted. If the search is successful, the control unit 14 proceeds from step 131 to point E in FIG. 5B (step 120) to compare modes Mdn and Mdn-i. If the search is unsuccessful, the control unit 14 proceeds from step 131 or 132 to point F in FIG. 5B (step 122) to set Hdn to zero, then returns to step 105 in FIG. 5A to detect another pulse.

Similarly, when Mdn is equal to four, success in the search in steps 112 to 115 in FIG. 5A leads to step 120 in FIG. 5B, while an unsuccessful search leads to step 122. Thus, whatever the inferred mode Mdn of the most recent pulse, step 121 is executed if a preceding pulse occurred substantially one mode-Mdn frame length before, and step 122 is executed otherwise.

Figure 6:
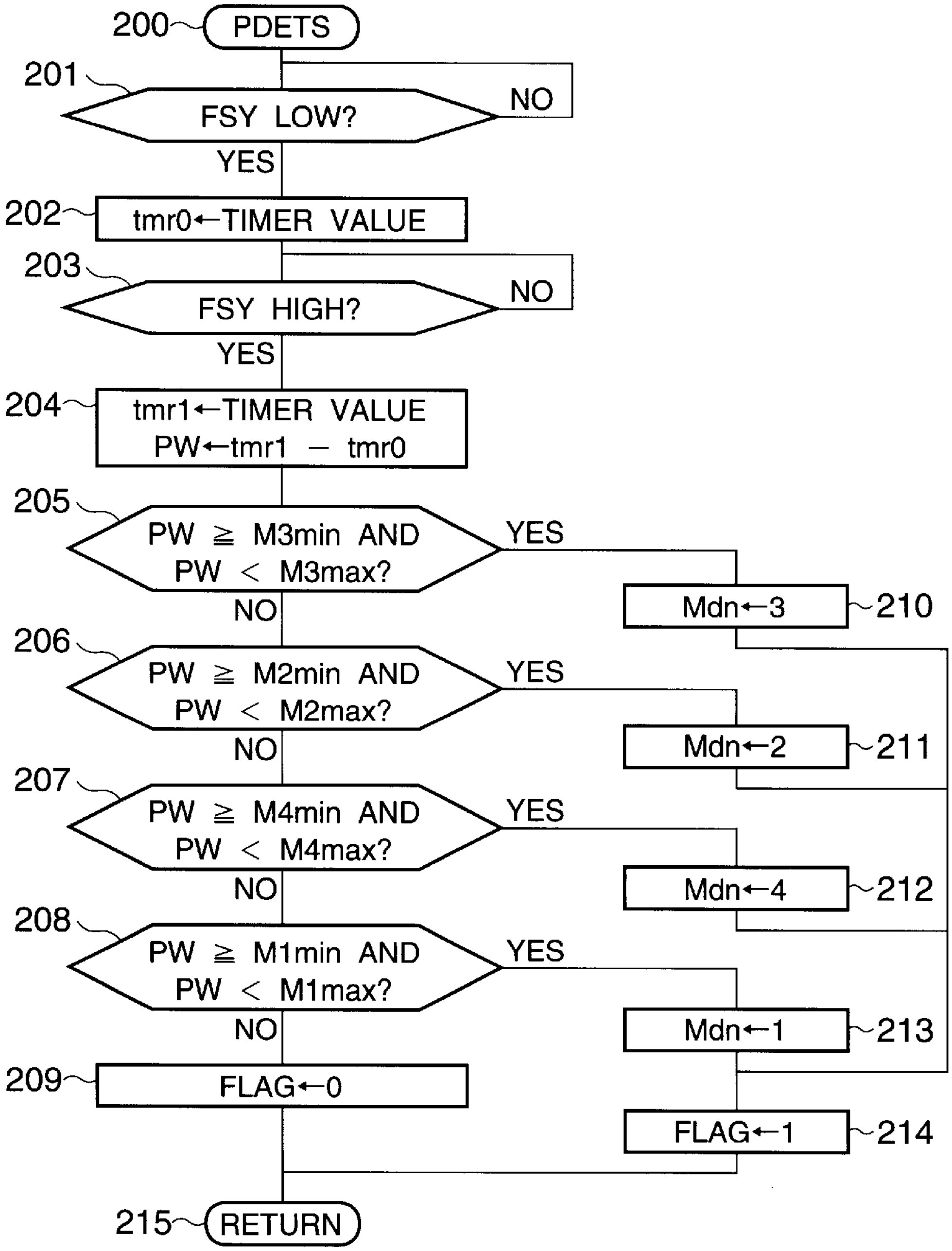
FIG. 6 is a flowchart describing a subroutine performed in the first embodiment and in a second embodiment.

The frame synchronization pulse detection process performed in steps 102 and 106 is illustrated in FIG. 6. The control unit 14 executes this process as a subroutine.

When the subroutine is called (step 200), the control unit 14 waits for the frame synchronization pulse signal FSY to go low (step 201). When FSY goes low, the control unit 14 stores the current value of the timer 15 in a variable tmr0 (step 202), then waits for FSY to go high (step 203). When FSY goes high, the control unit 14 stores the value of the timer 15 in a variable tmr1, subtracts tmr0 from tmr1 to obtain the pulse width of the detected pulse, and stores the pulse width in a variable PW (step 204).

The control unit 14 now determines whether the pulse width PW is within a range recognizable as a null symbol in transmission mode three (step 205). Specifically, the control unit 14 compares PW with a lower limit M3min and an upper limit M3max, the null-symbol length in mode three being between these limits.

If PW is not within the necessary range for mode three, it is tested against a similar range around the null-symbol length in transmission mode two (step 206), by comparison with a lower limit M2min and an upper limit M2max. If PW is not within the necessary range for either mode two or mode three, it is tested against a range around the null-symbol length in transmission mode four (step 207), by comparison with a lower limit M4min and an upper limit M4max. If PW is not within the necessary range for modes two, three, and four, it is tested against a range around the null-symbol length in transmission mode one (step 208), by comparison with a lower limit M1min and an upper limit M1max. If PW is not within the necessary range for any of modes one, two, three, and four, the control unit 14 clears the above-mentioned validity flag to zero, indicating an invalid pulse (step 209).

If PW is within the acceptable range for a mode-three null symbol, then following step 205, the control unit 14 writes three as the value of Mdn in the memory 16 (step 210). Similarly, if PW is within the acceptable range for a mode-two null symbol, a mode-four null symbol, or a mode-one null symbol, then following step 206, 207, or 208, the control unit 14 writes two, four, or one as the value of Mdn in the memory 16 (steps 211, 212, 213). Following any of these steps 210, 211, 212, 213, the control unit 14 sets the validity flag to one (step 214).

After the validity flag has been set or cleared in step 209 or 214, a return is made from the subroutine to the main processing flow (step 215).

The time taken to process one FSY pulse, from step 106 in FIG. 5A to step 123 in FIG. 5B, is short enough that the moment at which the frame synchronization acquisition process ends with the completion of step 124 can be regarded as the timing of the trailing edge of a null symbol.

The resulting timing error is well within the synchronization timing tolerance. If necessary, however, the timer value stored in the variable tmr0 or tmr1 can be read to determine the exact timing of the leading or trailing edge of the null symbol.

As described above, while attempting to acquire frame synchronization, the first embodiment keeps a history of all relevant information in the memory 16, including width, interval, and count information for any FSY pulse that might represent a null symbol. No valid pulse is discarded, but pulses with invalid widths are ignored. The screening of pulse widths before the intervals between pulses are tested leads to faster and more reliable acquisition of frame synchronization than in conventional methods that consider the pulse interval first and the pulse width second.

A particular feature of the first embodiment is that a separate count is kept for every series of pulses that might truly represent consecutive frame synchronization signals. In the presence of noise, several counts may be proceeding simultaneously, one being a count of true frame synchronization signals, the others being counts of noise pulses that chance to mimic the pulse width and frame length of frame synchronization signals. Such mimicry is unlikely to continue for long, so if the value of N is appropriate, the probability of acquiring false frame synchronization becomes vanishingly small. Moreover, while counting noise pulses, the control unit 14 does not ignore or stop counting true frame synchronization signals. Frame synchronization is thus acquired in substantially the same amount of time, regardless of the presence or absence of noise.

Figure 7:
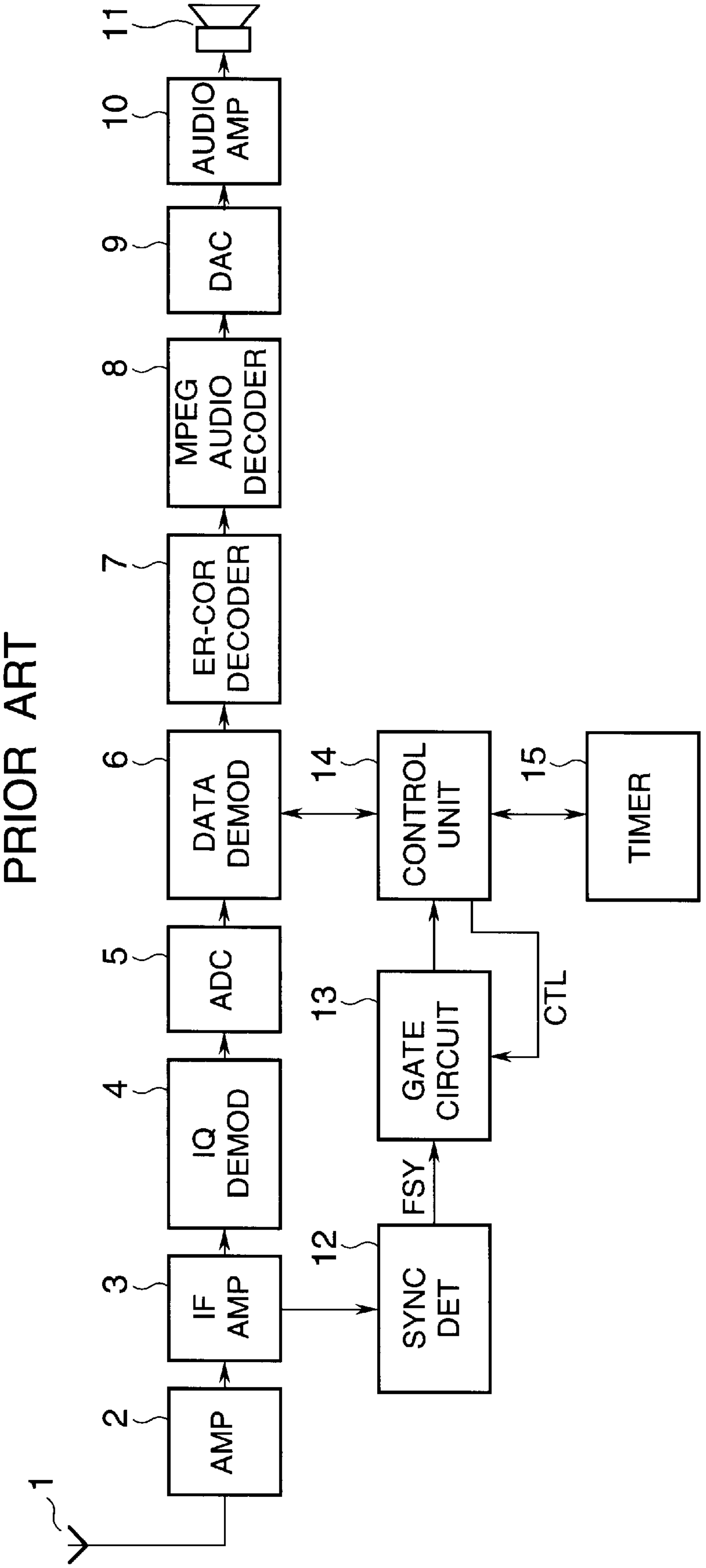
FIG.7 PRIOR ART
FIG. 7 is a block diagram of a conventional digital audio broadcast receiver.
Figure 8:
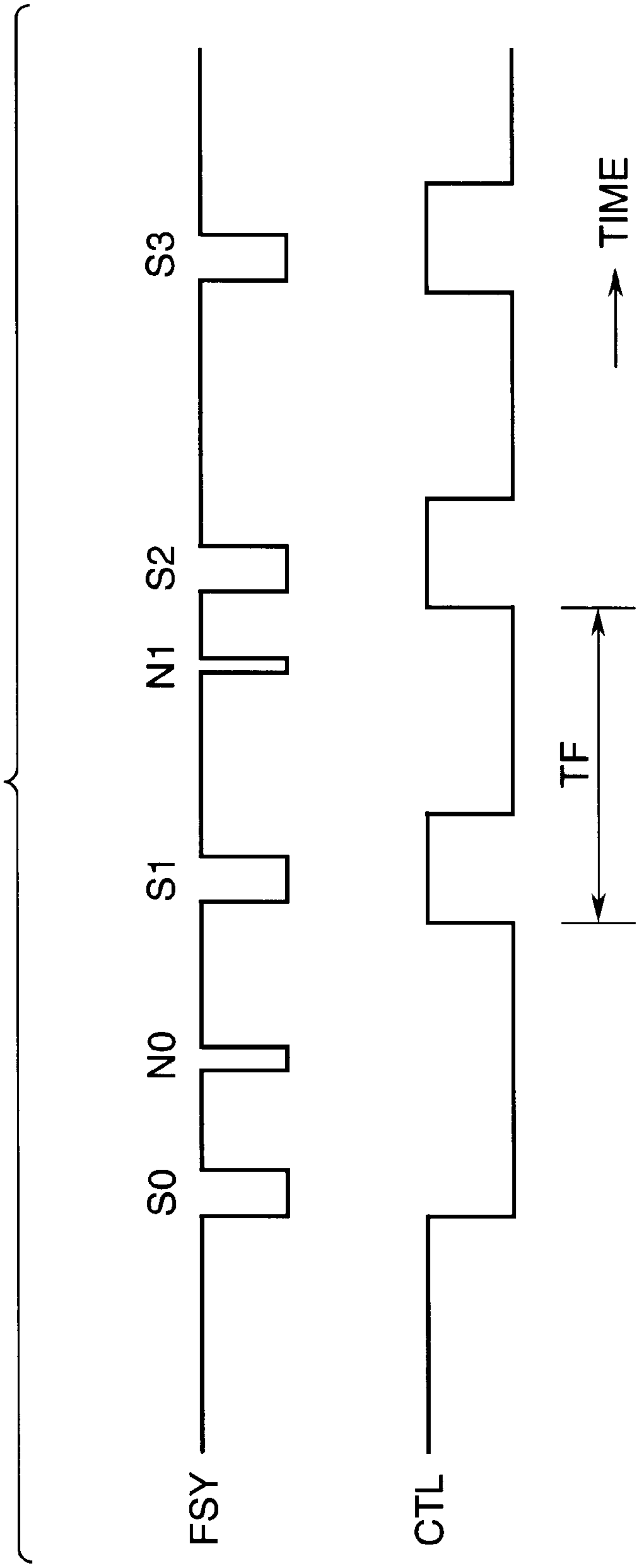
FIG.8 PRIOR ART
FIG. 8 is a waveform diagram illustrating the operation of the conventional digital audio broadcast receiver.

For comparison, FIG. 7 shows a block diagram of a conventional digital audio broadcast receiver having a gate circuit 13 between the synchronization signal detector 12 and control unit 14, and not storing detailed information about previously detected pulses in a memory. FIG. 8 illustrates the operation of the gate circuit 13. The gate circuit 13 allows frame synchronization pulses FSY to reach the control unit 14 while a control signal CTL received from the control unit 14 is high. The control signal CTL is held high until the first pulse S0 is detected, then goes high at intervals TF equal to, for example, the shortest of the three frame lengths (24 ms). In the example illustrated, frame synchronization pulses S1, S2, S3 occurring at this interval are allowed through, while noise pulses N0 and N1 are blocked.

The gating scheme works well in this example, but if the first detected pulse had been noise pulse N0, then the control signal CTL would have been low during pulses S1, S2, and S3, and these three valid pulses would have been ignored. When much noise is present, the conventional receiver may have to make several false starts, triggered by noise pulses, before finding the right gate timing and starting to count true frame synchronization signals.

Next, a second embodiment will be described. During the acquisition of frame synchronization, the second embodiment looks for frame synchronization pulses occurring both one and two frame lengths before the most recent pulse.

The second embodiment stores four items of information in each block in the memory 16. The pulse interval Ipn and mode number Mdn are the same as in the first embodiment, but instead of a single consecutive pulse count Hdn, the second embodiment stores two counts Hd1n and Hd2n (n is the block number). In a series of pulses of similar widths detected at intervals of one or two frame lengths, Hd1n is the number of pulses detected at intervals of one frame length, and Hd2n is the number of pulses detected at intervals of two frame lengths.

Figure 9A:
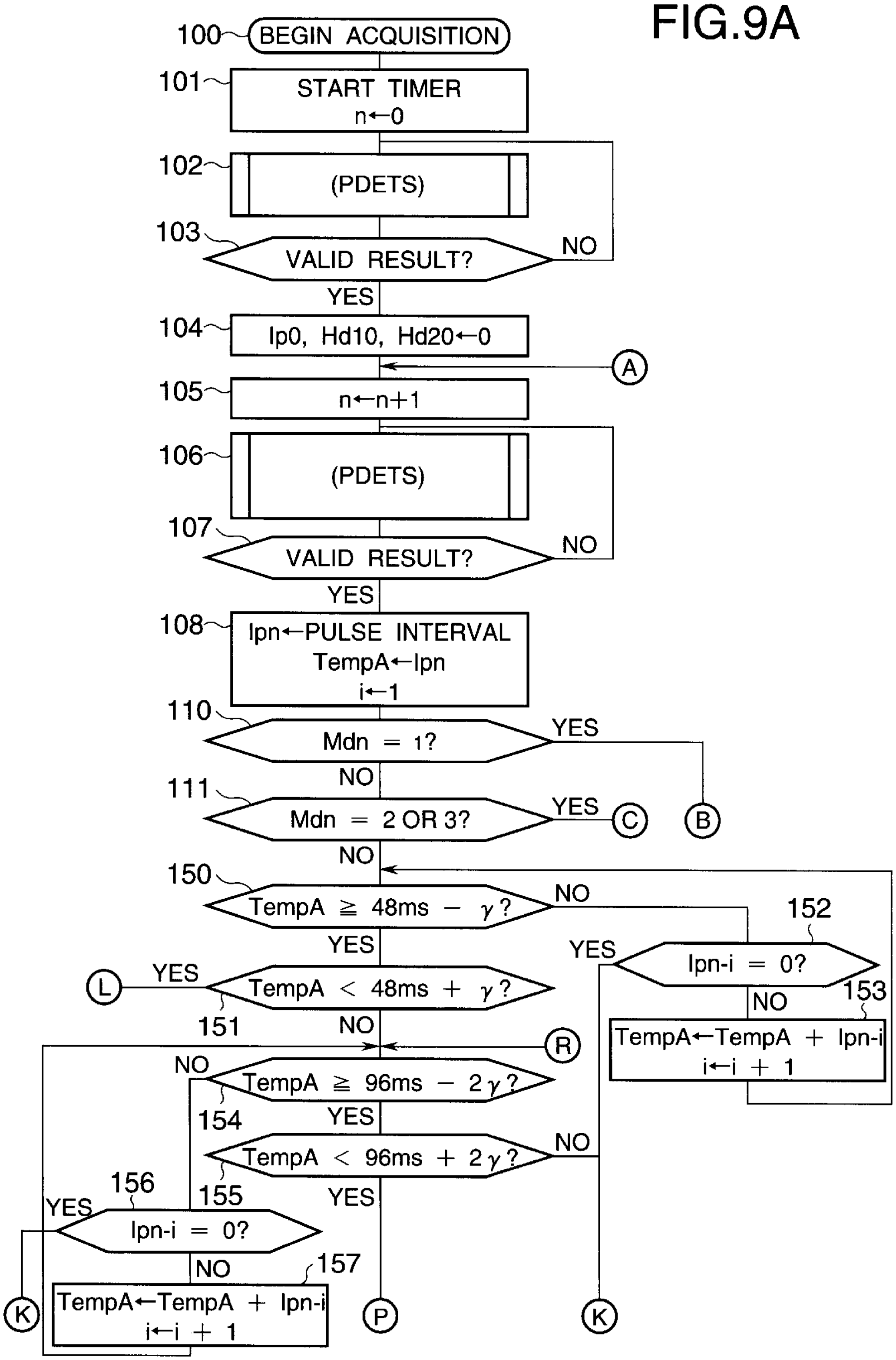
FIGS. 9A, 9B, 9C, and 9D are a flowchart illustrating the operation of the second embodiment of the invention.

Referring to FIG. 9A, the frame synchronization acquisition process in the second embodiment starts with the same steps 100 to 111 as in the first embodiment, which store information for the first valid FSY pulse in the memory 16, detect the next valid pulse, and determine the mode indicated by the width of this pulse. The same subroutine as in the first embodiment is used in steps 102 and 106. Both Hd10 and Hd20 are set to zero in step 104.

If the mode Mdn indicates transmission mode four (if Mdn is not one, two, or three), then following step 111, the control unit 14 compares the pulse interval variable TempA with a lower limit (48 ms−γ) and an upper limit (48 ms+γ). If the pulse interval TempA is less than the lower limit, and if TempA is not the interval from the initial pulse (that is, if Ipn-i is not zero), then TempA is extended one pulse back by adding Ipn-i and incrementing i, and the comparison is repeated. These steps (steps 150, 151, 152, 153) are similar to the corresponding steps (steps 112, 113, 114, 115) in the first embodiment. If a pulse occurring substantially one mode-four frame length before the most recent pulse is found, yielding a yes decision in step 151, the process branches to FIG. 9C.

If TempA acquires a value exceeding the upper limit tested in step 151, yielding a no decision in that step, then the control unit 14 searches in a similar manner for a preceding pulse occurring two mode-four frame lengths before the most recent pulse (steps 154, 155, 156, 157). The lower limit (96 ms−2γ) tested in step 154 and the upper limit (96 ms+2γ) tested in step 155 are twice as large as the limits tested in steps 150 and 151. Steps 156 and 157 are identical to steps 152 and 153. If a pulse occurring substantially two mode-four frame lengths before the most recent pulse is found, yielding a yes decision in step 155, the process branches to a certain point (P) in FIG. 9B. If no such pulse is found, the process branches to another point (K) in FIG. 9B.

Figure 9B:
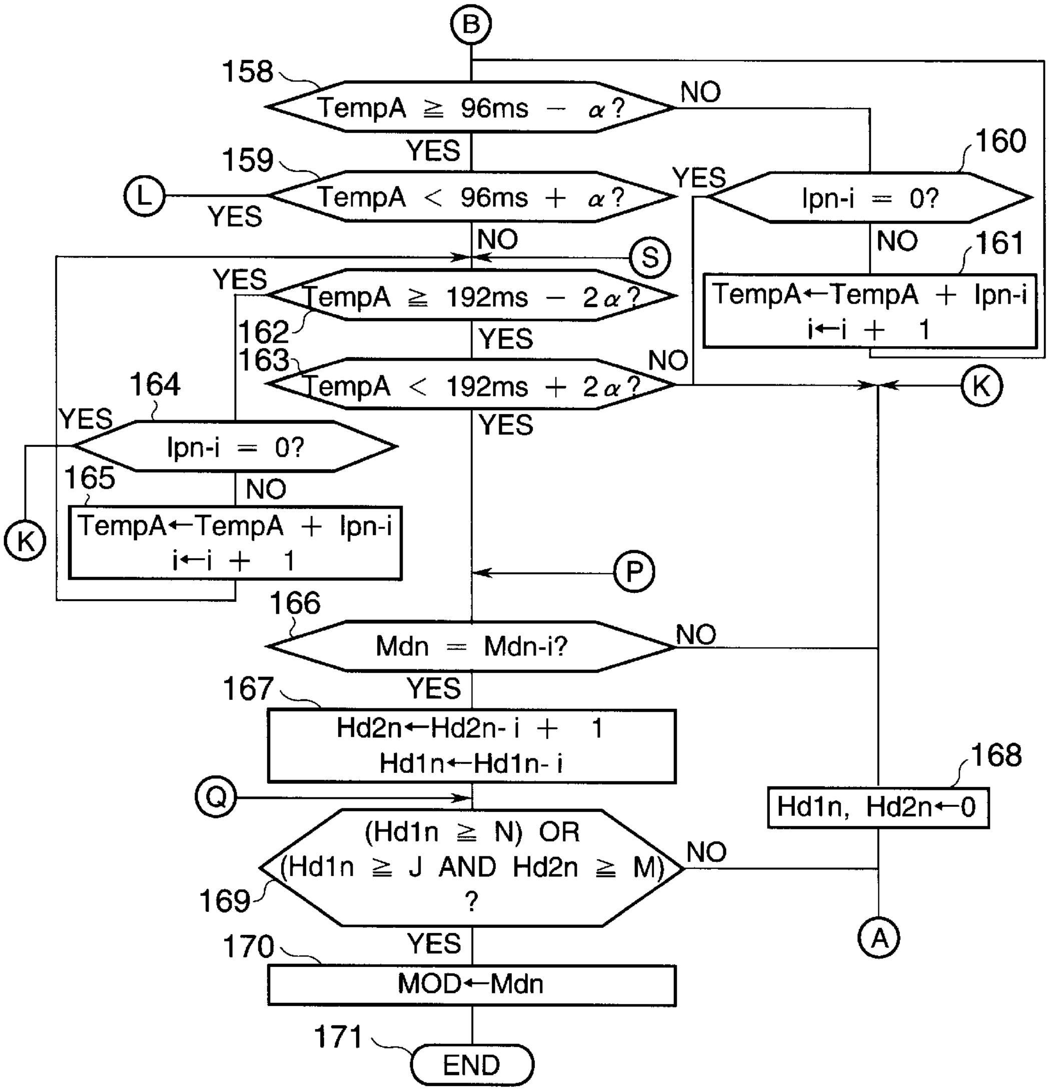

Similarly, if Mdn is equal to one, then following step 110, the process branches to the top of FIG. 9B to search for a pulse substantially one mode-one frame length before the most recent pulse (steps 158, 159, 160, 161). If TempA exceeds the upper limit tested in step 159, a search is made for a pulse occurring substantially two mode-one frame lengths before the most recent pulse (steps 162, 163, 164, 165).

If a pulse (pulse n-i) occurring substantially two frame lengths before the most recent pulse is found, yielding a yes decision in step 155 or 163, then the mode values of that pulse (Mdn-i) and the most recent pulse (Mdn) are compared (step 166). If the two modes are the same, the control unit 14 adds one to the value Hd2n-i in memory block n-i, and writes the result as Hd2n in memory block n. The control unit 14 also copies the value of Hd1n-i as Hd1n (step 167). If the two modes (Mdn and Mdn-i) are not the same, the control unit 14 sets both Hd1n and Hd2n to zero (step 168), and returns to step 105 to increment n and detect another pulse.

Following step 167, the control unit 14 tests the values of Hd1n and Hd2n (step 169). If Hd1n is equal to or greater than a predetermined number N, or if Hd1n is equal to or greater than a smaller predetermined number J and Hd2n is equal to or greater than yet another predetermined number M, the transmission mode is regarded as having been positively identified. In this case, the control unit 14 assigns the identified mode (Mdn) to the variable MOD (step 170) and terminates the frame synchronization acquisition process (step 171). If the result of step 169 is that the transmission mode has not yet been positively identified, the process returns to step 105 in FIG. 9A to increment n, detect another pulse, and seek further confirmation.

Figure 9C:
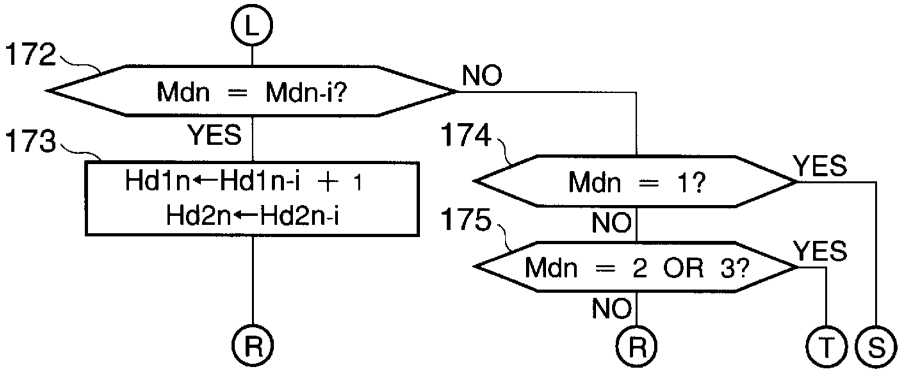

If a preceding pulse occurring substantially one expected frame length before the most recent pulse is found, yielding a yes decision in step 151 or 159, then the process branches to FIG. 9C. The mode values of the preceding pulse (Mdn-i) and the most recent pulse (Mdn) are compared (step 172). If the two modes are the same, the control unit 14 adds one to the value Hd1n-i in memory block n-i, writes the result as Hd1n in memory block n, and copies the value of Hd2n-i into Hd2n (step 173).

If the two modes (Mdn and Mdn-i) are not the same in step 172, the process branches to a point that depends on the detected mode (Mdn) of the most recent pulse (steps 174 and 175). If Mdn is equal to one, the process branches to step 162 to search for a pulse occurring two mode-one frame lengths before the most recent pulse. If Mdn is equal to two or three, the process branches to a point (T) in FIG. 9D to search for a pulse occurring two mode-two or mode-three frame lengths before the most recent pulse. If Mdn is equal to four, the process branches to step 154 in FIG. 9A to search for a pulse occurring two mode-four frame lengths before the most recent pulse.

Figure 9D:
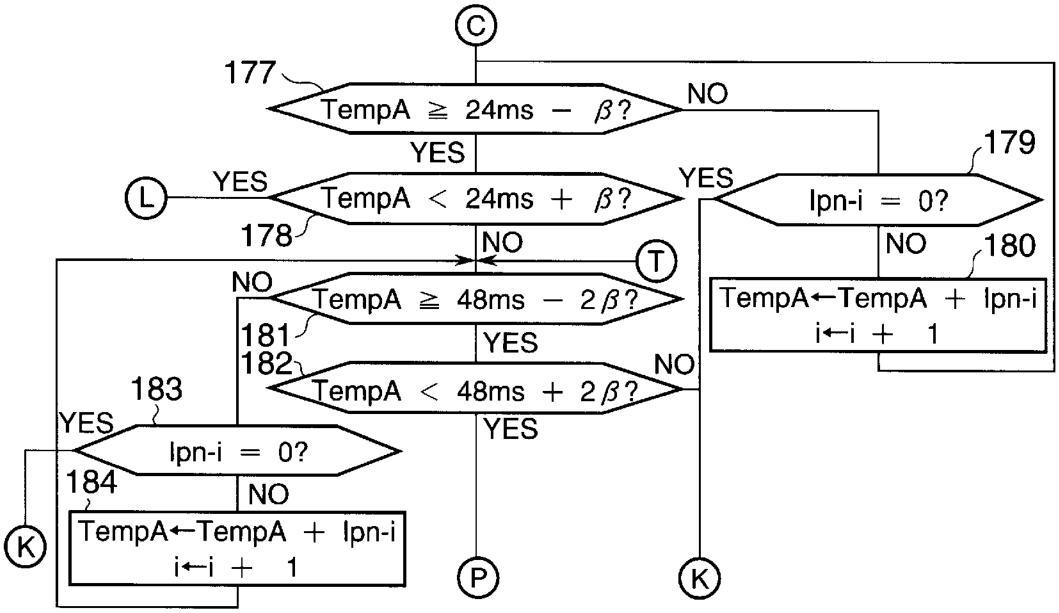

If mode two or three is identified in step 111 in FIG. 9A, then a search is made for a pulse occurring substantially one mode-two or mode-three frame length (24 ms) before the most recent pulse (steps 177, 178, 179, 180 in FIG. 9D). If the search is successful, the process branches to FIG. 9C. If TempA exceeds the upper limit tested in step 178, a search is made for a pulse occurring substantially two mode-two or mode-three frame lengths before the most recent pulse (steps 181, 182, 183, 184), and the process branches to step 166 in FIG. 9B if the search is successful. If the searches made in FIG. 9D are both unsuccessful, the process branches to step 168 in FIG. 9B to step Hd1n and Hd2n to zero, then returns to step 105 in FIG. 9A to increment n and detect another pulse.

By counting pulses occurring two frame lengths before the most recent pulse, the second embodiment allows for the possible non-detection of a frame synchronization signal due to interference or noise. By keeping separate counts (Hd1n, Hd2n) of pulses of the proper width detected at intervals of one and two frame lengths, the second embodiment permits the setting of decision criteria, such as J, M, and N in step 169, that give appropriate weight to missing frame synchronization signals.

The second embodiment provides effects similar to those of the first embodiment. Frame synchronization is acquired rapidly and reliably, because pulse counts and other information about all preceding pulses are retained. Under reception conditions producing missing frame synchronization signals, frame synchronization is acquired even more quickly than in the first embodiment.

The second embodiment can be modified by extending the search for a preceding pulse of the appropriate width to higher multiples of the frame length. For example, Hd2n can be a count of pulses occurring two or three frame lengths before the most recent pulse. Alternatively, separate counts can be kept for intervals of two frame lengths and intervals of three frame lengths.

The second embodiment can also be modified by the use of more complex decision criteria in step 169.

Those skilled in the art will recognize that further variations are possible within the scope claimed below.

What is claimed is:

1. A digital audio broadcast receiver for receiving a digital audio broadcast signal, comprising:

a synchronization signal detector detecting frame synchronization signals in the digital audio broadcast signal;

a control unit coupled to said synchronization signal detector, acquiring frame synchronization according to the detected frame synchronization signals;

a timer coupled to said control unit, measuring pulse widths of said frame synchronization signals and intervals between said frame synchronization signals; and a memory coupled to said control unit, storing a history of the pulse widths and intervals measured by said timer and a history of counts of frame synchronization signals of predetermined widths detected at predetermined intervals, for use by said control unit in acquiring said frame synchronization.

2. The digital audio broadcast receiver of claim 1, wherein said digital audio broadcast signal is broadcast in one of a plurality of transmission modes, and the history of pulse widths stored in said memory identifies the transmission modes consistent with said pulse widths.

3. The digital audio broadcast receiver of claim 2, wherein said control unit ignores frame synchronization signals having pulse widths not consistent with any of said transmission modes.

4. The digital audio broadcast receiver of claim 2, wherein said history of counts comprises counts of frame synchronization signals having substantially equal pulse widths, detected at consecutive intervals equal to a frame length in a transmission mode consistent with said substantially equal pulse widths.

5. The digital audio broadcast receiver of claim 2, wherein said history of counts comprises counts of frame synchronization signals having substantially equal pulse widths, detected at consecutive intervals equal to multiples of one frame length in a transmission mode consistent with said substantially equal pulse widths, said counts being kept separately for intervals of one frame length and intervals of more than one frame length.

6. A method of acquiring frame synchronization in a digital audio broadcast receiver receiving a digital audio broadcast signal by detecting frame synchronization signals in the digital audio broadcast signal, comprising the steps of:

measuring pulse widths of said frame synchronization signals, and retaining information about the measured pulse widths in a memory until said frame synchronization is acquired;

measuring intervals between said frame synchronization signals, and retaining information about the measured intervals in said memory until said frame synchronization is acquired;

counting frame synchronization signals of predetermined pulse widths detected at predetermined intervals, and retaining a history of counts thus obtained in said memory until said frame synchronization is acquired; and acquiring said frame synchronization according to said history of counts.

7. The method of claim 6, wherein said digital audio broadcast signal is broadcast in one of a plurality of transmission modes, and said information about the measured pulse widths identifies the transmission modes consistent with said pulse widths.

8. The method of claim 7, further comprising the step of ignoring frame synchronization signals not having pulse widths consistent with any of said transmission modes.

9. The method of claim 7, wherein said step of counting comprises counting frame synchronization signals having substantially equal pulse widths, detected at consecutive intervals equal to a frame length in a transmission mode consistent with said substantially equal pulse widths.

10. The method of claim 7, wherein said step of counting further comprises the steps of:

counting frame synchronization signals having substantially equal pulse widths, detected at consecutive intervals equal to multiples of one frame length in a transmission mode consistent with said substantially equal pulse widths;

keeping a first history of counts of frame synchronization signals detected at intervals of one frame length; and keeping a second history of counts of frame synchronization signals detected at intervals of more than one frame length.

* * * * *